Feb. 24, 1953 R. B. DOME ET AL 2,629,819
LOAD COMPENSATING NETWORK
Filed Sept. 17, 1949 2 SHEETS—SHEET 1
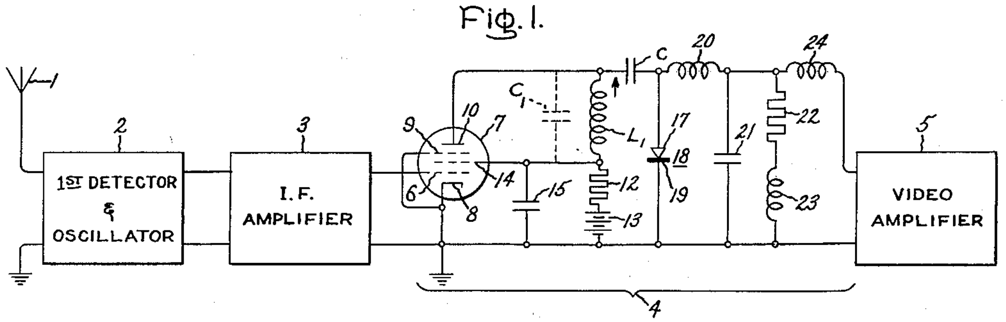
Fig. 1a.
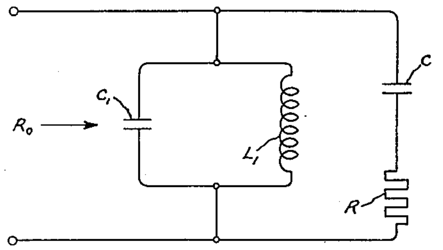
Fig. 1b.
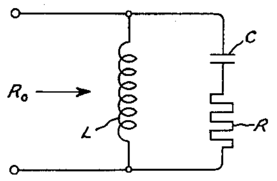
Fig. 2.
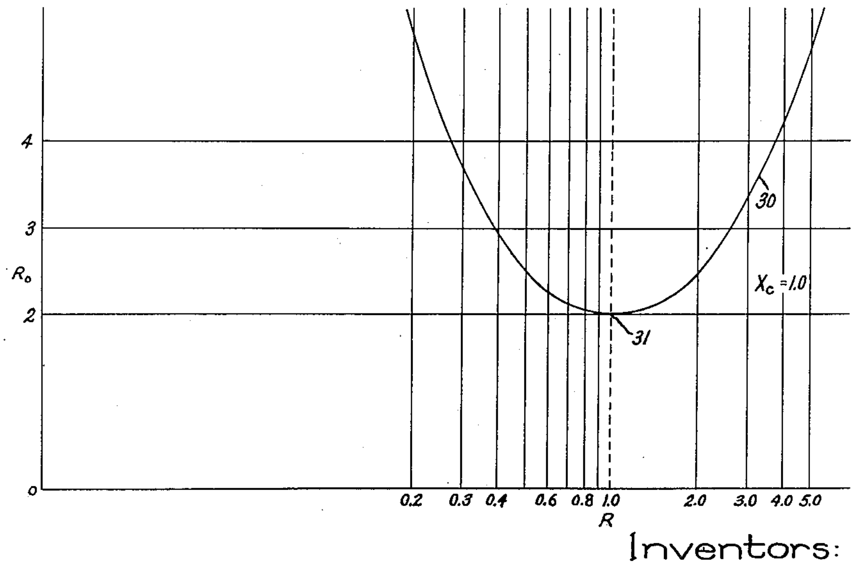
Inventors:
Robert B. Dome,
Raymond F. Foster,
by Merton D. Moore
Their Attorney.

LOAD COMPENSATING NETWORK

Filed Sept. 17, 1949 2 SHEETS—SHEET 2

Inventors:
Robert B. Dome,
Raymond F. Foster,
by Merton D. Morse
Their Attorney.

Patented Feb. 24, 1953 2,629,819

UNITED STATES PATENT OFFICE 2,629,819

LOAD COMPENSATING NETWORK

Robert B. Dome and Raymond F. Foster, Syracuse, N. Y., assignors to General Electric Company, a corporation of New York Application September 17, 1949, Serial No. 116,312

5 Claims. (Cl. 250—20)

Figure 3:
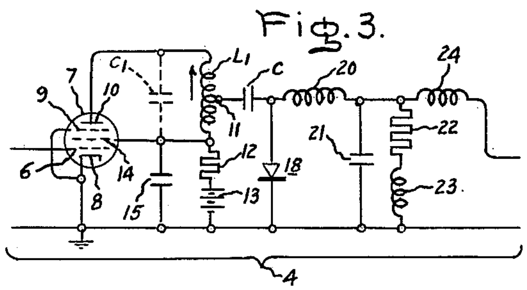

Our invention relates to electrical circuits and, more particularly to load compensation circuits adapted to operate with a wide variety of load impedances. While our invention is of general utility, it is particularly useful in situations wherein loads of widely different impedances may be utilized to derive a useful output from the circuit while the effective resistance at the input terminals of the circuit remains substantially constant.

For certain purposes it is desirable to utilize load impedances having a wide tolerance of impedance in conjunction with a resonant circuit, yet the selectivity of the resonant circuit must remain substantially constant. Such a requirement is found, for example, in modulated carrier wave receivers of the superheterodyne type in which a crystal rectifier is utilized to detect a received carrier wave so as to derive useful modulation therefrom. The effective load resistance presented by the crystal rectifier and its associated load resistor is subject to such wide variations in resistance, due to non-unformity in the resistance of crystals and the like, that it is almost impossible to maintain a band pass characteristic of uniform width in a conventional circuit in which the load impedance is connected directly in parallel with the resonant output circuit of the preceding amplifier. It is therefore a primary object of our invention to provide a new and improved load compensation circuit.

It is another object of our invention to provide a new and improved load compensation circuit suitable for use as a coupling network between the intermediate frequency amplifier and second detector of a modulated carrier wave receiver of the superheterodyne type.

It is a further object of our invention to provide a new and improved load compensation circuit adapted for use with a resonant band pass circuit wherein a band pass characteristic of constant width is obtained despite wide variations in the value of a load impedance connected thereto.

It is a still further object of our invention to provide a new and improved load compensating network wherein a load impedance subject to variations in impedance over a wide range of values is utilized to derive a useful output from a resonant circuit while maintaining the bandwidth of the resonant circuit substantially constant and wherein additional means are provided for varying the bandwidth of the resonant circuit with a given load impedance.

Briefly, our improved load compensating circuit includes a parallel resonant circuit having a predetermined band width when shunted by a load impedance of predetermined value. In accordance with our invention, a load impedance having a resistive component falling within a predetermined wide range of values, and a capacitor are connected in series and the series combination thus formed is connected across the resonant circuit so as to derive a useful output therefrom.

The reactance of the capacitor at the resonant frequency of the system is made equal to the mean value of the resistive component of the load impedance. By such an arrangement the effective load impedance across the circuit remains substantially constant and hence the band width of the resonant circuit remains substantially constant over the total range of values of the resistive component of said load impedance. The load impedance may comprise, for example, a crystal rectifier and its associated load resistor.

In a preferred embodiment, an inductance is placed across the load impedance so as partially to tune out the residual shunt capacity of the load impedance, the remaining capacitive reactance being such as to present in combination with the resistive component of the load impedance, an effective series resistance equal to the damping resistance required by the resonant circuit to obtain a band pass characteristic of a desired width.

Figure 3A:
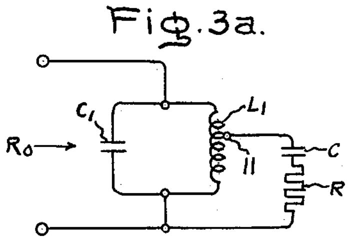
Figure 4:
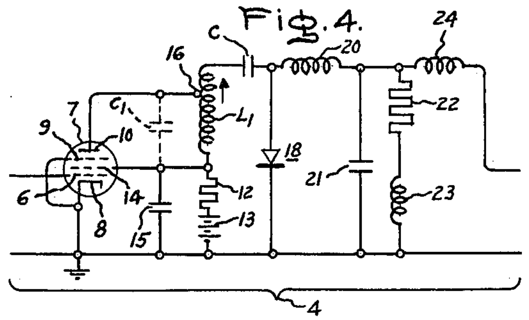
Figure 4A:
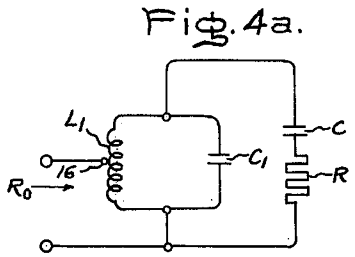

The features of our invention which we believe to be novel are set forth with particularity in the appended claims. Our invention itself, however, both as to its organization and method of operation, together with further objects and advantages thereof, may best be understood by reference to the following description taken in connection with the accompanying drawings, in which Fig. 1 is a circuit diagram, partially in block diagram form, of a modulated carrier wave receiver embodying the principles of our invention; Figs. 1*a* and 1*b* are simplified equivalent circuit diagrams of portions of Fig. 1; Fig. 2 is a graph, illustrating certain characteristics of the circuit of Fig. 1; Figs. 3 and 3*a* are actual and equivalent circuit diagrams, respectively, illustrating a modification of Fig. 1; Figs. 4 and 4*a* are similar circuit diagrams illustrating another modification of Fig. 1; and Figs. 5 and 5*a*–5*d* are similar circuit diagrams illustrating still another modification of Fig. 1.

In the various figures, corresponding elements have been identified by the same reference symbols, to facilitate comparison.

Referring now to the drawing, there is illustrated in Fig. 1 thereof the video frequency channel of a modulated carrier wave television receiver of the superheterodyne type wherein is incorporated a load compensating circuit constructed in accordance with principles of our invention. In the receiver illustrated in Fig. 1 there is provided an antenna system 1 to which are connected in cascade relation in the order named, a first detector and oscillator 2, an intermediate frequency amplifier 3, a final intermediate frequency amplifier and detector circuit 4, to be described more fully hereinafter, and a video frequency amplifier 5.

The units 1 through 3 inclusive and 5 may all be of conventional well-known construction so that a detailed illustration thereof is unnecessary herein. Referring briefly, however, to the operation of the above-described receiver as a whole, signals which are intercepted by antenna system 1 are coupled to first detector and oscillator 2 wherein they are selected and converted into intermediate frequency signals which are in turn selectively amplified in intermediate frequency amplifier 3. The output of amplifier 3 is connected to a final intermediate frequency amplifier and detector 4 wherein the modulation components of the intermediate frequency signal are amplified and detected. The detected modulation components are supplied to video frequency amplifier 5 wherein they are amplified and from which they are supplied in the usual manner to the control electrode of a cathode ray tube viewing device.

Referring now more particularly to the portion of Fig. 1 embodying the principles of our invention, the output of intermediate frequency amplifier 3 is connected through a suitable coupling network to the control electrode 6 of an electron discharge device 7. The cathode 8 of device 7 is connected to ground as is the suppressor electrode 9. The anode 10 of device 7 is connected through an anode load inductance $L_1$ and a de-coupling resistor 12 to the positive terminal of a unidirectional source of potential illustrated as the battery 13.

The screen electrode 14 of device 7 is connected to the junction point of inductance $L_1$ and resistor 12 and is also connected to ground through a bypass capacitor 15. A coupling and load compensating capacitor C is employed to connect the anode 10 to the anode 17 of a crystal rectifier 18, the cathode 19 of rectifier 18 being connected to ground. An inductance 20 and bypass capacitor 21 are connected in series across rectifier 18. A further series combination of a resistor 22 and an inductance 23 is connected across bypass capacitor 21. An inductance 24 is connected from the junction point of inductance 20 and resistor 22 to the input circuit of video amplifier 5. The distributed capacity associated with inductance $L_1$ and the circuit capacity associated with anode 10 is shown as a capacitor $C_1$ which is illustrated in dotted lines as connected across inductance $L_1$.

Considering now the operation of the above-described intermediate frequency amplifier and detector circuit, intermediate frequency signals are supplied to the control electrode 6 of device 7 and are amplified therein and supplied to the anode load circuit of device 7 comprising inductance $L_1$ and capacitor $C_1$. Inductance $L_1$ is preferably made variable, as by a powdered iron core or the like, so as to tune the anode circuit to the desired resonant frequency and also so as to adjust for crystal rectifiers having different values of load impedance as will be described more fully hereinafter. Resistor 12 and capacitor 15 operate as a conventional decoupling network, the capacitor 15 being sufficiently large to bypass to ground any intermediate frequency signals appearing across resistor 12. The modulated intermediate frequency signals produced in anode circuit $L_1$, $C_1$ are connected through capacitor C to crystal rectifier 18 which operates in conjunction with the associated load resistor 22 as detector therefor. The relatively low frequency modulation components of the modulated intermediate frequency signal appear across the load resistor 22 associated with crystal rectifier 18, capacitor 21 operating to bypass any currents of intermediate frequency which would tend to be produced across load resistor 22.

Inductances 23, 24 operate as compensating chokes and are arranged in the conventional series and shunt compensating network so as to compensate for the shunt capacity of the rectifier 18 and the input circuit of the video amplifier 5 thereby to obtain a frequency response curve of the desired configuration. It will be appreciated that the chokes 23 and 24 are only necessary in the event that a frequency characteristic of substantial width is required in which case the shunt capacities of the associated circuits require compensation. In this connection, it will be understood that the intermediate frequency amplifier and detector circuit, herein illustrated as employed in a television receiver, may equally well be employed in either amplitude-modulated or frequency-modulated carrier wave radio receivers. In such cases the frequency characteristics of the system will be of substantially less width than in corresponding video frequency apparatus and the compensating chokes 23, and 24 may be eliminated.

The inductance 20, in conjunction with capacitor 21, acts as a filtering means to prevent any signals of intermediate frequency from appearing across load resistor 22. Also, in accordance with the present invention, the inductance 20 is utilized to provide means for obtaining the correct effective shunt resistance across the overall network, as will be described in more detail hereinafter.

In the circuit of Fig. 1, the crystal rectifier 18, which operates to detect the modulation components of the intermediate frequency signal, has an internal resistance which varies over a wide range of values due to non-uniformities in the structure and manufacture of such rectifiers. In a conventional circuit, wherein the crystal detector is placed substantially directly across the resonant circuit of the preceding amplifier stage, the non-uniformity in crystal resistance causes non-uniform shunting of the resonant circuit and hence a band pass characteristic which is non-uniform in width. It is thus almost impossible to use such crystal rectifiers as detectors in modulated carrier wave receivers wherein the resistance of the crystal rectifier plays an important part in determining the total rectifier circuit resistance such as, for example, receivers having a wide band frequency characteristic. This is because of the wide range of resistance values of the crystals and the non-uniformity in band pass characteristics which results therefrom.

In accordance with our invention, the reactance of capacitor C at the desired intermediate frequency is made equal to the mean value of the resistive component of the crystal rectifier circuit comprising crystal rectifier 18 and the associated load resistor 22. By so proportioning capacitor C, relative to the effective rectifier circuit resistance, the total shunt resistance across resonant circuit $L_1$, $C_1$, and hence the band pass characteristic of resonant circuit $L_1$, $C_1$, remains substantially constant over a wide range of values of rectifier circuit resistance.

In order better to explain the operation of our invention we have represented in a more elementary schematic form in Fig. 1*a* the load compensating circuit of Fig. 1. In this figure, we have again represented the anode load inductance as the inductance $L_1$ and the distributed capacity as the capacitor $C_1$. The coupling capacitor C of Fig. 1 and the total load resistance of the rectifier circuit 18, 22, represented as the resistor R, are connected in series across circuit $L_1$, $C_1$. In accordance with our invention the effective shunt resistance across the total circuit, which is represented by the symbol $R_0$, remains substantially constant over a wide range of variation in the value of resistance R when the reactance of compensating capacitor C is made equal to the mean value of load resistance R.

In order to analyze the system as thus described, the circuit of Fig. 1*a* may be further simplified by replacing the inductance $L_1$ and capacitor $C_1$ by a single equivalent inductance L, as is illustrated in Fig. 1*b*. The justification for such simplification will be readily apparent when it is realized that the inductance $L_1$ and capacitor $C_1$ of Figs. 1 and 1*a* must always be such as to provide an overall inductive reactance so as to resonate with the effective capacitive reactance presented by compensating capacitor C and any capacitive load reactance. Such a condition may readily be obtained by varying the value of inductance $L_1$, by any suitable means. The capacitive branch comprising capacitor C and rectifier circuit resistance R remains the same as in Fig. 1*a*.

With the simplified three element network of Fig. 1*b*, we may now write the equation for the total impedance of the series parallel combination. The impedance Z of the three element network may be solved for by reference to the following equation:

$$\frac{1}{Z}=\frac{1}{pL}+\frac{1}{R+\frac{1}{pC}} \qquad (1)$$

where $p=j\omega$.

Solving for Z in Equation 1 we obtain:

$$Z=\frac{p^4L^2C^2R+p^3L^2C-p^3C^2R^2L+pL}{(1+p^2LC)^2-p^2C^2R^2} \qquad (2)$$

Substituting $j\omega$ for $p$, we have for the impedance of the three element network:

$$Z=\frac{\omega^4L^2C^2R+j(\omega L-\omega^3L^2C+\omega^3C^2R^2L)}{(1-\omega^2LC)^2+\omega^2C^2R^2} \qquad (3)$$

The real part of Equation 3 is the effective shunt resistance component $R_0$ under investigation; the imaginary component being $X_0$, the effective shunt reactance of the network. Since the inductance L is to be adjusted so as to resonate with the total effective reactance of the circuit comprising capacitor C and resistor R at the operating frequency, the inductive and capacitive components balance out and the circuit may be considered to be purely resistive. This means that $X_0$, the effective shunt reactance, is equal to zero. By so setting the imaginary component, L may be solved for as follows:

$$X_0=\omega L-\omega^3L^2C+\omega^3C^2R^2L=0$$

or, $$1-\omega^2LC+\omega^2C^2R^2=0$$

whence, $$L=\frac{1+\omega^2C^2R^2}{\omega^2C} \qquad (4)$$

In order to obtain the resistive component of Equation 3 the real terms thereof are separated and we obtain the following:

$$R_0=\frac{\omega^4L^2C^2R}{(1-\omega^2LC)^2+\omega^2C^2R^2} \qquad (5)$$

Substituting the L of Equation 4 into Equation 5 we have:

$$R_0=R\left(1+\frac{X^2}{R^2}\right) \qquad (6)$$

where, $$X=\frac{1}{\omega C}\ (\text{reactance of } C)$$

Equation 6 expresses the relationship between the rectifier circuit resistance R, the effective shunt resistance of the circuit $R_0$ and the reactance of C. For the purpose of analysis let us assume that $X=1$, in which case $R_0$ then takes on the following values as R varies:

| Rectifier Circuit Resistance R | Effective Shunt Resistance $R_0$ |
|---|---|
| 0 | ---------- |
| .1 | 10.1 |
| .2 | 5.2 |
| .3 | 3.64 |
| .4 | 2.90 |
| .5 | 2.50 |
| .6 | 2.27 |
| .7 | 2.15 |
| .8 | 2.05 |
| .9 | 2.01 |
| 1.0 | 2.00 |
| 1.11 | 2.01 |
| 1.25 | 2.05 |
| 1.43 | 2.13 |
| 1.67 | 2.27 |
| 2.00 | 2.50 |
| 2.50 | 2.90 |
| 3.33 | 3.64 |
| 5.00 | 5.20 |
| 10.0 | 10.1 |

It will be observed from the above set of figures that as R varies from .5 to 2, a range of 1 to 4 in rectifier circuit resistance, the value of $R_0$, the effective shunt resistance of the circuit remains substantially constant and varies only in the ratio of 1.25 to 1. Obviously, the value of $R_0$ may be held within even closer limits if the variations in R are correspondingly restricted.

The relationship of $R_0$ and R is graphically illustrated by the curve 30 shown in Fig. 2 wherein the above-mentioned data have been plotted. It is evident that this relationship takes the form of a hyperbolic curve, the cusp 31 of which occurs at the point at which X is equal to R. Inasmuch as X has been taken as equal to one, this point occurs where R likewise is equal to one. Thus, the reactance of the compensating capacitor C of Fig. 1 is preferably made equal to the mean value of the total effective rectifier circuit resistance R so as to obtain the maximum load compensating effect from the network.

In the event that the value of $R_0$ as determined from Equation 6 and the above-mentioned design criterion is not of the desired value, a transformation circuit may be utilized to adjust the effective shunt resistance $R_0$ to the required value. For example, if a larger value of $R_0$ is needed than is provided by Equation 6, in order to obtain the desired band pass characteristic, the modified circuit illustrated in Fig. 3 may be employed. This is the same as the amplifier and detector circuit 4 of Fig. 1 except that the coupling capacitor C is connected to an intermediate tap point 11 on anode load inductance $L_1$. The equivalent load circuit, as seen from the anode 10 of amplifier 7, is represented in Fig. 3*a*. In this figure the capacitive branch including capacitor C and rectifier circuit resistance R is illustrated as connected to the tap 11 on inductance $L_1$, the circuit capacity associated with inductance $L_1$ again being represented by the capacitor $C_1$ in a manner similar to that of Fig. 1*a*. By such an arrangement, a rectifier circuit having a relatively low value of R may be transformed to a higher effective shunt resistance across the total circuit. The increase in effective resistance is dependent upon the particular tapping point which is selected, in accordance with well known transformer theory.

In the event that an effective shunt resistance is required which is less than the value of $R_0$ as determined from Equation 6, the alternative circuit shown in Fig. 4 may be employed. This circuit is also the same as that of Fig. 1 except that in this case the anode 10 of amplifier 7 is tapped down on inductance $L_1$, being connected to a tap point 16. The equivalent load circuit in this case is represented in Fig. 4*a*. In Fig. 4*a* the input terminals of the compensating network are connected to the tap 16 on inductance $L_1$ the capacitive branch comprising capacitor C and resistor R being connected across the parallel circuit comprising inductance $L_1$ and capacitor $C_1$. By such an arrangement, the effective shunt resistance presented by the capacitive branch is reduced by an amount which is dependent upon the tapping point to which the input circuit is connected. It is thus possible by proper choice of circuit arrangement to provide any desired value of effective shunt resistance so that a band pass characteristic of any desired width may be obtained.

In a practical embodiment the load compensating circuit of Fig. 1 may include additional elements required by the practical realization of the electrical constants of the circuit. Thus, the rectifier circuit may have associated therewith a residual shunt capacitance, due to the inherent shunt capacity of the crystal rectifier and the like. The basic circuit of Fig. 1 has been illustrated in Fig. 5 as including such residual capacitance, this capacitance being represented as a capacitor $C_2$, shown in dotted line form as connected across the rectifier 18. In order that the relationship established in connection with Fig. 1*a* and set forth in Equation 6 may be preserved, the capacitance $C_2$ is preferably resonated by means of an inductance $L_2$ which is effectively connected in shunt to rectifier 18 through the intermediate frequency bypass capacitor 21. The inductance $L_2$ is preferably chosen with a view towards resonating with the capacitance $C_2$ at the resonant frequency of the system so as to eliminate the effect of the residual shunt capacitance across load resistor R. The equivalent circuit diagram for the anode load impedance of amplifier 7 is therefore as represented in Fig. 5*a* for this modification.

Figure 5:
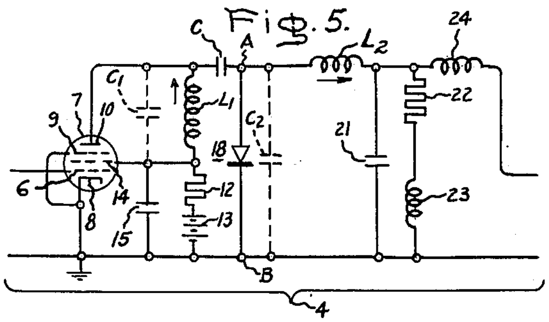
Figure 5A:
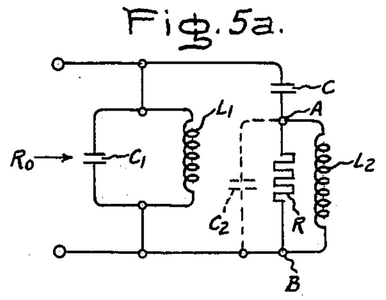

In the event that the effective shunt resistance $R_0$, in a particular application, is of too high a value to obtain the desired band width in the overall circuit, the circuit of Fig. 5 may be modified electrically, without changing the physical circuit arrangement, so as to accomplish a reduction in the effective shunt resistance in a manner substantially different from and simpler than the tapped inductance arrangement of Fig. 4. In this embodiment, the inductance $L_2$, illustrated in Figs. 5 and 5*a* as being used to tune out the residual shunt capacitance $C_2$, is made to have a larger value of inductance so that the net reactance due to $C_2$ and $L_2$, between points A and B of the circuit of Fig. 5, is capacitive at the resonant frequency of the system. The resultant capacitive reactance shunting the load resistor R reduces the effective resistance between points A and B of the circuit so as to obtain the desired reduction in effective shunt resistance $R_0$.

Figure 5B:
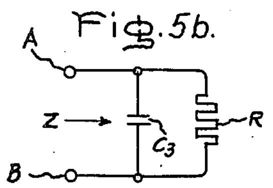

In order to investigate mathematically the changes in our considerations produced by the modification of Fig. 5 described above, the portion of the circuit between points A and B may be simplified as shown in the equivalent diagram of Fig. 5*b*. Inasmuch as the net reactance across rectifier resistance R due to $C_2$ and $L_2$ is capacitive at the desired intermediate frequency, the equivalent circuit of the portion of Fig. 5 between the points A and B thereof may be represented as shown in Fig. 5*b* wherein the shunt combination of inductance $L_2$ and capacitor $C_2$ at the resonant frequency of the system is represented as the capacitor $C_3$. The rectifier circuit resistance R is now shunted by the capacitor $C_3$, thereby reducing the effective shunt resistance across the resonant circuit. With the arrangement of Fig. 5*b*, the required bandwidth as well as the desired load compensation are simultaneously achieved.

The compensating inductance $L_2$ may be made variable by any conventional means thus providing a convenient means for varying the band width of the overall circuit without interfering with the above-mentioned load compensating effect.

Figure 5C:
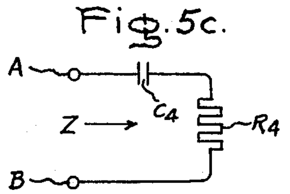

The effective value of circuit resistance, when R is shunted by the capacitance $C_3$ may be calculated by obtaining the equivalent series resistance of the shunt network of Fig. 5*b*. The equivalent series circuit is illustrated in Fig. 5*c* as comprising an equivalent series capacitance $C_4$ and the resistance $R_4$. the resistance $R_4$ being the equivalent series resistance which is effective to shunt the circuit $L_1C_1$ by an amount sufficient to give a band pass characteristic of the desired width. To calculate the value of $R_4$, we first obtain the equation for the total impedance Z of the shunt network of Fig. 5*b* which is:

$$Z=\frac{\frac{R}{pC_3}}{R+\frac{1}{pC_3}} \tag{7}$$

Since $p=j\omega$, Equation 7 becomes upon substitution $$Z=\frac{R-j\omega C_3R}{1+\omega^2C_3^2R^2} \tag{8}$$

The equivalent series circuit resistance $R_4$ of Fig. 5*c* is the real part of Equation 8 or:

$$R_4=\frac{R}{1+\omega^2C_3^2R^2} \tag{9}$$

The equivalent series circuit capacitance $C_4$ of

Fig. 5c may be obtained from the imaginary part of Equation 8, and becomes:

$$C_4=\frac{1+\omega^2C_3^2R^2}{\omega^2C_3R^2} \qquad (10)$$

Figure 5D:
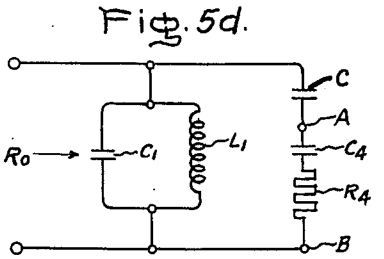

When the equivalent series circuit of Fig. 5c is utilized, the basic equivalent circuit of Fig. 1a is modified electrically as illustrated in Fig. 5d. In the circuit of Fig. 5d, the values of capacitor C must be modified so as to take into account the series condenser $C_4$ already in the circuit. Thus Equation 6 becomes:

$$R_0=R_4\left[1+\frac{(X+X_4)^2}{R_4^2}\right] \qquad (11)$$

where $X_4$=reactance of equivalent series capacitor $C_4$. The cusp of the hyperbolic curve 30 of Fig. 2 will again occur when the total series reactance of capacitors C and $C_4$ is made equal to $R_4$, or where:

$$\frac{1}{\omega C}+\frac{\omega C_3R^2}{1+\omega^2C_3^2R^2}=\frac{R}{1+\omega^2C_3^2R^2} \qquad (12)$$

so that the required value of C is:

$$C=\frac{1}{\omega R}\left[\frac{1+\omega^2C_3^2R^2}{1-\omega C_3R}\right] \qquad (13)$$

where $C_3$ is the net capacitance of the shunt combination of capacitor $C_2$ and inductance $L_2$ as discussed in connection with Fig. 5b.

Equation 11 for $R_0$ may now be simplified by substituting therein Equation 13 for C, in which case $$R_0=\frac{2R}{1+\omega^2C_3^2R^2} \qquad (14)$$

From the above analysis it is evident that our improved load compensating circuit has the additional advantage of providing a convenient adjustment of the band width of the resonant anode circuit of the preceding amplifier when operating with a rectifying device of substantially fixed impedance. In this connection, it will be noted that we provide a compensating network wherein a double conversion from series to parallel network is provided. Thus, the first shunt network comprising equivalent shunt capacitor $C_3$ and equivalent resistance R is made equal to an equivalent series network $C_4R_4$, which network, in conjunction with an additional series capacitor C, is made equal to an equivalent second shunt network across the total circuit, the resistive component of this second shunt network being $R_0$, the damping resistance required to give a predetermined bandwidth to the overall network.

By way of illustration, let us assume that the basic circuit of Fig. 1 comprises a crystal rectifier circuit having a total circuit resistance R equal to 2500 ohms, and that the resonant frequency of the system is 44 megacycles. Then, in accordance with our invention, the series capacitor C should have a reactance of 2500 ohms so that $$C=\frac{1}{\omega X}=1.45 \text{ mmf.}$$

The value of $R_0$ is twice R, or $R_0$=5000 ohms.

In the event that the value of $R_0$ is too large to give the desired bandwidth, let us further assume that the equivalent capacitance $C_3$ of Fig. 5b (which is the net shunt capacitance of the combination of residual shunt capacity $C_2$ and inductance $L_2$), is 1.1 mmf. Then from Equation 13 the new value of C becomes $$C=\frac{1}{2\pi 44(10)^6 2500}\left[\frac{1+(2\pi)^2(44)^2(10)^{12}(2500)^2(1.1)^2(10)^{-24}}{1-(2\pi)(44)(10^6)(2500)(1.1)(10^{-12})}\right]$$

or, $C$=9.5 mmf.

The new value of $R_0$ from Equation 14 then becomes:

$$R_0=\frac{(2)(2500)}{1+(4\pi^2)(44)^2(10^{12})(1.1)^2(10^{-24})(2500)^2}$$

or, $R_0$=3160 ohms.

The effective shunt resistance $R_0$ across the resonant anode circuit $L_1$, $C_1$ of Fig. 1 is thus lowered to a value sufficient to give a substantially increased bandwidth while retaining the desirable result of compensating for large changes in the resistance of rectifier circuit 13—22.

While we have illustrated our improved load compensating circuit as contained in the video frequency channel of a television receiver, it will be apparent to those skilled in the art that our improved load compensating circuit may equally well be employed in other types of modulated carrier wave receivers, for example, in amplitude-modulated carrier wave or frequency-modulated carrier wave receivers wherein it is desired to employ a crystal rectifier or other type of rectifying device subject to wide variations in impedance, in the modulation detector arrangement.

While our invention has been described by reference to particular embodiments thereof, it will be understood that numerous modifications may be made by those skilled in the art without departing from the invention. We therefore aim in the appended claims to cover all such equivalent variations as come within the true spirit and scope of our invention.

What we claim as new and desire to secure by Letters Patent of the United States is:

1. In a modulated carrier wave receiver, the combination of an intermediate frequency amplifier having an inductive anode load impedance connected in circuit therewith, means for supplying an intermediate frequency signal to said amplifier, a rectifier circuit having a resistance falling within a predetermined relatively wide range of resistance values, and means for coupling said rectifier circuit to said anode load impedance so as to detect the modulated components of said intermediate frequency signal comprising, a capacitor connected in series with said rectifier circuit, the series combination thus formed being connected across said load impedance, said combination having a value of effective series capacitive reactance at said intermediate frequency which is substantially equal to the mean value of said rectifier circuit resistance and which resonates with said anode load impedance at said intermediate frequency, whereby rectifier circuits having resistances varying over said wide range of values may be utilized without substantially changing the band width of the network including said anode load impedance, said capacitor and said rectifier circuit.

2. In a modulated carrier wave receiver, the combination of an intermediate frequency amplifier having an anode load impedance connected in circuit therewith, means for supplying an intermediate frequency signal to said amplifier, said load impedance comprising a parallel-resonant circuit tuned to have a net inductive reactance at said intermediate frequency, a crystal rectifier and load circuit having a combined resistance falling within a range of values from one-half to two times the mean resistance thereof, and a capacitor connected in series with said rectifier, the series combination of said capacitor and said rectifier and load circuit being connected across said anode load impedance, said combination having a value of effective series capacitive reactance at said intermediate frequency substantially equal to the mean effective series resistance of said rectifier and load circuit said anode load impedance and series combination also being adjusted conjointly to provide a parallel-resonant circuit tuned to said frequency, whereby rectifiers having resistances anywhere within said wide range of values may be utilized without substantially changing the band width of the network comprising said anode load impedance, said capacitor and said rectifier and load circuit.

3. In a modulated carrier wave receiver, the combination of an intermediate frequency amplifier having an anode load impedance connected in circuit therewith, means for supplying an intermediate frequency signal to said amplifier, said load impedance comprising a parallel-resonant circuit tuned to have a net inductive reactance at said intermediate frequency, a rectifier circuit including a rectifier having a value of resistance falling within a predetermined wide range of resistance values and having a residual shunt capacity associated therewith, an inductance effectively connected across said rectifier, a capacitor connected in series with said rectifier circuit, the series combination thus formed being connected across said anode load impedance, said anode load impedance, said capacitor and the effective series capacitance of said rectifier circuit and said inductance in combination having a total series reactance at said intermediate frequency substantially equal to the mean value of the effective series resistance thereof and also substantially equal to said net inductive reactance of said load impedance, whereby rectifiers having resistances varying over said wide range of values may be utilized without substantially changing the shunting effect thereof on said network.

4. A load compensating network comprising a source of alternating signal voltages extending over a frequency band having a predetermined mean frequency, a first two-terminal network energized from said source, said network comprising a parallel-resonant circuit tuned to provide a net inductive reactance between the terminals of said network at said frequency, a second two-terminal network energized in parallel with said first network from said source, said second network comprising a load circuit including a load device having a predetermined shunt capacity and a resistance which may lie anywhere within a range of resistance values, said second network also comprising a compensating capacitor in series with said load circuit and an inductance effectively in shunt to said device, said inductance having a reactance at said frequency which at least partially balances the shunt capacity of said device, said compensating capacitor being so adjusted that said second network has an effective series capacitive reactance substantially equal to its mean effective series resistance at said frequency, and said two circuits being adjusted conjointly to resonate at said frequency.

5. A load compensation system comprising a source of alternating signal voltages extending over a frequency band having a predetermined mean frequency, a first two-terminal network energized from said source, said network comprising a parallel-resonant circuit tuned to provide a net inductive reactance between the terminals of said network at said frequency, a second two-terminal network connected effectively in parallel to said first network, said second network comprising a load circuit including a resistive load device having a predetermined shunt capacity, an inductance connected effectively in shunt to said device and a compensating capacitor connected in series with said load circuit, said load device having a resistance which may lie anywhere within a range of resistance values, said inductance having a reactance at said frequency greater than the capacitive reactance of said load device, said capacitor being so adjusted that the effective series capacitive reactance of said second network is substantially equal to its mean effective series resistance at said frequency, and said two networks being adjusted conjointly to resonate at said frequency.

ROBERT B. DOME.
RAYMOND F. FOSTER.

REFERENCES CITED

The following references are of record in the file of this patent:

UNITED STATES PATENTS

| Number | Name | Date |
|---|---|---|
| 1,700,625 | Burket | Jan. 29, 1929 |
| 1,923,155 | Lewis et al. | Aug. 22, 1933 |
| 1,937,783 | Place | Dec. 5, 1933 |
| 1,954,059 | Place | Apr. 10, 1934 |
| 2,161,959 | Hardwick | June 13, 1939 |
| 2,195,095 | Rinia | Mar. 26, 1940 |
| 2,293,480 | Tovar | Aug. 18, 1942 |